(12) United States Patent
Williams et al.

(10) Patent No.: US 11,247,766 B2
(45) Date of Patent: Feb. 15, 2022

(54) LEADING EDGE STRUCTURE

(71) Applicants: AIRBUS OPERATIONS LIMITED, Bristol (GB); AIRBUS OPERATIONS GMBH, Hamburg (DE)

(72) Inventors: Llifon Williams, Bristol (GB); Ross Salisbury, Bristol (GB); Marcus Rafla, Bristol (GB); Hugh Theobald, Bristol (GB); Christopher Payne, Bristol (GB); Robert McCormick, Bristol (GB); Heinz Hansen, Weyhe (DE); Timothy Evans, Bristol (GB)

(73) Assignees: AIRBUS OPERATIONS LIMITED, Bristol (GB); AIRBUS OPERATIONS GmbH, Hamburg (DE)

( * ) Notice: Subject to any disclaimer, the term of this patent is extended or adjusted under 35 U.S.C. 154(b) by 503 days.

(21) Appl. No.: 16/195,630

(22) Filed: Nov. 19, 2018

(65) Prior Publication Data
US 2019/0092450 A1 Mar. 28, 2019

Related U.S. Application Data

(62) Division of application No. 14/360,512, filed as application No. PCT/GB2012/052888 on Nov. 22, 2012, now abandoned.

(30) Foreign Application Priority Data

Dec. 1, 2011 (GB) ...................................... 1120707

(51) Int. Cl.
*B64C 3/28* (2006.01)
*B64C 3/00* (2006.01)
(Continued)

(52) U.S. Cl.
CPC .................. *B64C 3/28* (2013.01); *B64C 3/00* (2013.01); *B64C 3/18* (2013.01); *B64C 3/187* (2013.01); *B64C 3/24* (2013.01); *B64C 2003/146* (2013.01)

(58) Field of Classification Search
CPC .. B64C 3/18; B64C 3/28; B64C 3/185; B64C 3/00; B64C 3/182; B64C 3/24; B64C 3/187; B64C 2003/146
See application file for complete search history.

(56) References Cited

U.S. PATENT DOCUMENTS

| 1,338,506 A | 4/1920 | Jagerspacher et al. |
| 2,116,953 A | 5/1938 | Sambraus |

(Continued)

FOREIGN PATENT DOCUMENTS

| DE | 10 2005 060958 | 6/2007 |
| DE | 10 2007 033 261 | 1/2009 |

(Continued)

OTHER PUBLICATIONS

UKIPO Search Report for GB1120707.3 dated Jul. 5, 2012—claims 41 to 52.
(Continued)

*Primary Examiner* — Christopher D Hutchens
(74) *Attorney, Agent, or Firm* — Nixon & Vanderhye P.C.

(57) ABSTRACT

A leading edge structure for providing an aerodynamic surface of an aircraft is disclosed having a skin structure, the skin structure providing an outer aerodynamic surface and an inner surface, both surfaces extending in a chordwise and spanwise direction of the structure, and a plurality of structural members, each structural member being connected to the inner surface of the skin structure and extending in the chordwise direction along the inner surface, wherein the structural members are integrally formed with the inner
(Continued)

surface of the skin structure. The disclosure is also related to an aircraft wing, aircraft tailplane, wing box structure, wing or wing structure and an aircraft including the leading edge structure.

11 Claims, 10 Drawing Sheets

(51) Int. Cl.
  *B64C 3/18* (2006.01)
  *B64C 3/24* (2006.01)
  *B64C 3/14* (2006.01)

(56) References Cited

U.S. PATENT DOCUMENTS

| | | | |
|---|---|---|---|
| 2,150,546 A * | 3/1939 | Flader | B64C 3/26 244/117 R |
| 2,218,122 A * | 10/1940 | Scheller | B64C 3/185 244/123.8 |
| 2,371,754 A | 3/1945 | Gillum et al. | |
| 2,427,065 A | 9/1947 | Nebesar | |
| 2,567,124 A | 9/1951 | Roberts | |
| 2,613,893 A | 10/1952 | Young | |
| 3,096,958 A | 7/1963 | Koontz | |
| 3,135,486 A | 6/1964 | Wing | |
| 3,910,530 A | 10/1975 | James et al. | |
| 4,012,549 A | 3/1977 | Slysh | |
| 4,159,089 A | 6/1979 | Cole | |
| 4,339,230 A | 7/1982 | Hill | |
| 4,667,905 A * | 5/1987 | Hamm | B64C 3/18 244/123.13 |
| 4,667,906 A | 5/1987 | Suarez et al. | |
| 6,116,539 A | 9/2000 | Williams et al. | |
| 6,314,630 B1 | 11/2001 | Munk | |
| 6,386,481 B1 | 5/2002 | Kallinen | |
| 6,520,706 B1 * | 2/2003 | McKague, Jr | B29C 70/549 403/265 |
| 7,037,568 B1 | 5/2006 | Rogers et al. | |
| 7,045,084 B1 * | 5/2006 | Reis | B29B 11/16 264/138 |
| 7,074,474 B2 | 7/2006 | Toi et al. | |
| 7,244,487 B2 * | 7/2007 | Brantley | B29C 65/561 244/123.7 |
| 7,419,627 B2 | 9/2008 | Sheu et al. | |
| 7,510,757 B2 | 3/2009 | Lee et al. | |
| 8,276,848 B2 * | 10/2012 | Zuniga | B64C 3/18 244/123.8 |
| 8,985,515 B2 * | 3/2015 | McCullough | F16B 5/12 244/131 |
| 9,681,527 B2 * | 6/2017 | Foltz | H05F 3/00 |
| 10,131,092 B1 * | 11/2018 | Cook | A63G 31/12 |
| 2003/0136815 A1 | 7/2003 | Debaisieux et al. | |
| 2003/0192990 A1 | 10/2003 | Simpson et al. | |
| 2004/0055349 A1 | 3/2004 | El-Soudani | |
| 2004/0079838 A1 * | 4/2004 | Simpson | B64C 3/20 244/123.7 |
| 2004/0101655 A1 | 5/2004 | Bryans | |
| 2006/0032982 A1 | 2/2006 | Stephens | |
| 2006/0113450 A1 * | 6/2006 | Kilwin | F16B 5/08 248/346.03 |
| 2008/0105661 A1 * | 5/2008 | Kirkwood | B64C 3/185 219/121.64 |
| 2008/0128552 A1 | 6/2008 | Namaizawa et al. | |
| 2008/0128553 A1 | 6/2008 | Brown | |
| 2008/0164376 A1 | 7/2008 | Kato et al. | |
| 2009/0041985 A1 | 2/2009 | Von Varendorff et al. | |
| 2009/0047482 A1 | 2/2009 | Starke | |
| 2009/0206203 A1 | 8/2009 | Crawford | |
| 2009/0218450 A1 | 9/2009 | Mcalinden et al. | |
| 2010/0006700 A1 | 1/2010 | Stuhr et al. | |
| 2010/0065687 A1 | 3/2010 | Douglas | |
| 2010/0162567 A1 * | 7/2010 | Kirkwood | B64C 3/28 29/897.2 |
| 2010/0181427 A1 | 7/2010 | Makela | |
| 2012/0052247 A1 | 3/2012 | Pook et al. | |
| 2012/0104168 A1 * | 5/2012 | Latorre Plaza | B64C 3/26 244/123.1 |
| 2013/0011605 A1 | 1/2013 | Miller | |
| 2013/0026295 A1 * | 1/2013 | Schlipf | B64C 3/28 244/123.7 |
| 2013/0062467 A1 | 3/2013 | Soenarjo | |
| 2014/0138487 A1 | 5/2014 | Hodkisson et al. | |
| 2014/0293497 A1 * | 10/2014 | Foltz | B64D 45/02 361/218 |
| 2017/0008611 A1 * | 1/2017 | Murta | B64C 3/18 |

FOREIGN PATENT DOCUMENTS

| | | |
|---|---|---|
| EP | 0428011 | 5/1991 |
| EP | 0893342 | 1/1999 |
| EP | 1338506 | 8/2003 |
| EP | 1371551 | 12/2003 |
| EP | 2130762 | 12/2009 |
| EP | 2196309 | 6/2010 |
| EP | 2196391 | 6/2010 |
| FR | 2918036 | 1/2009 |
| GB | 156395 | 1/1921 |
| GB | 615275 | 1/1949 |
| GB | 615284 | 1/1949 |
| GB | 2471408 | 12/2010 |
| JP | 2003072691 | 3/2003 |
| JP | 2003220428 | 8/2003 |
| JP | 2004055349 | 2/2004 |
| JP | 2006512240 | 4/2006 |
| JP | 2010181427 | 8/2010 |
| RU | 1788688 | 12/1995 |
| WO | 03/000546 | 1/2003 |
| WO | 2008/022428 | 2/2008 |
| WO | 2008/119664 | 10/2008 |
| WO | 2009/112641 | 9/2009 |
| WO | 2011/073573 | 6/2011 |
| WO | 2013/079918 | 6/2013 |

OTHER PUBLICATIONS

UKIPO Search Report for GB1120707.3 dated Jul. 5, 2012—claims 32 to 40.
UKIPO Search Report for GB1120707.3 dated Jul. 4, 2012—claims 20 to 31.
UKIPO Search Report for GB1120707.3 dated Mar. 21, 2012—claims 1 to 19 & 53 to 55.
International Search Report dated Apr. 3, 2013 in International Application No. PCT/GB2012/052888, filed Nov. 22, 2012.
Written Opinion dated Apr. 3, 2013 in International Application No. PCT/GB2012/052888, filed Nov. 22, 2012.
RU1788688 (C), Publication Date Dec. 10, 1995. Applicant(s): Aviat NT Kompleks IM A N Tupol.

* cited by examiner

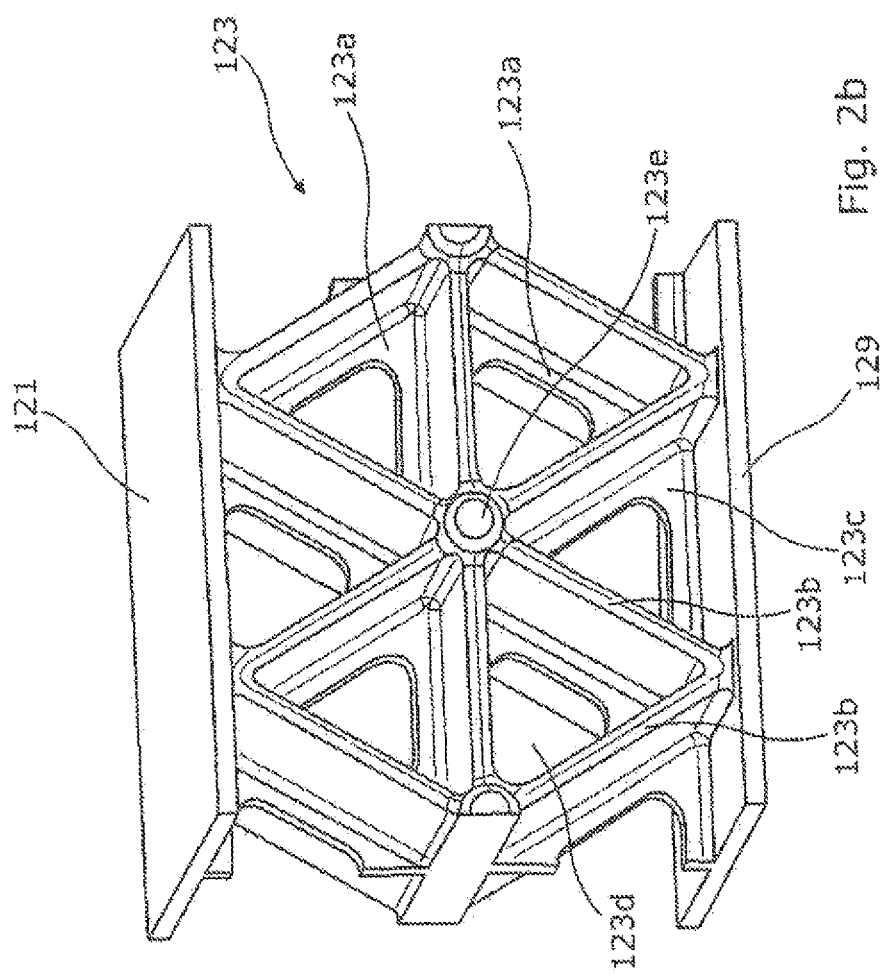

LEADING EDGE STRUCTURE

CROSS RELATED APPLICATIONS

This application is a Divisional of U.S. patent application Ser. No. 14/360,512, filed May 23, 2014, which is the U.S. National Phase of International Application No. PCT/GB2012/052888, filed Nov. 22, 2012, and claims priority from United Kingdom (GB) Patent Application No. 1120707.3, filed Dec. 1, 2011, the entire contents of which are hereby incorporated by reference.

BACKGROUND OF THE INVENTION

The present invention concerns a leading edge structure. More particularly, but not exclusively, this invention concerns a leading edge structure for providing an aerodynamic surface of an aircraft, the leading edge structure comprising a skin structure and a plurality of ribs and/or sub-spars for supporting the skin structure.

In aircraft wing design, it is important to design the wings such that flow over the wings stays laminar for as long as possible. This requires the leading edge structure of the wing to be designed and manufactured as accurately as possible to provide good wave control over the whole of the leading edge structure and to minimise the impact of disturbances in the airflow by minimising steps, lumps and bumps (e.g. fasteners) on the leading edge structure. Furthermore, the leading edge structure must be capable of being robust and light enough for use on an aircraft. In particular, for use on a commercial transport aircraft, it must be capable of flying for, for example, 18 hours a day without any degradation to the laminar flow. In addition, the leading edge structure must be capable of supporting a high lift mechanism, such as a leading edge flap or slat.

A leading edge structure generally comprises a smooth aerodynamic nose, which forms the foremost edge of a wing (in relation to the oncoming airflow). The leading edge structure extends rearwardly, with aerodynamic upper and lower surfaces extending outwardly from the nose. The leading edge structure also generally has a rearmost edge region which attaches to the front of the main wing structure to form the complete wing structure.

It should be noted that the some of the same problems apply to other leading edge structures that are part of a structural member of an aircraft, but not part of a wing structure. For example, the concept of achieving laminar flow also applies to other surfaces of an aircraft, such as a tailplane.

Leading edge structures are normally constructed with skins and a sub-structure.

The skins can be structural skins that transmit load from the leading edge into the main wing box. They are usually made of metal (for example, aluminium or titanium alloy or steel) or composite material (for example, Glass Fibre Reinforced Polymer (GFRP) or Carbon Fibre Reinforced Polymer (CFRP)). The structural skins are traditionally monolithic in nature, each skin being formed from a single piece of material. They often have stringers/stiffeners running along them in the spanwise direction (i.e. inboard-outboard).

Another type of skin structure is a panel. These panels do not generally carry the main wing loads and, instead, simply maintain the aerodynamic shape. Again, these panels can be made from metals or composite materials. The panels can be monolithic but, more usually, are made as sandwich panels with a layer of core material (such as honeycomb or closed cell foam) in between two face sheets.

All known prior art sub-structures contain ribs. Most ribs are constructed from aluminium alloy and can be machined from a billet or assembled in parts. Some ribs have been made with composite materials but this is generally done when neighbouring components are also made of composite materials.

Some prior art sub-structures also contain a sub-spar running in a spanwise direction. These sub-spars are generally assembled with the skins and ribs and are generally made from the same material as the ribs.

The various components of leading edge structures are normally mechanically fastened together (for example, using rivets) but can also be bonded, or even thermoplastically welded, together.

A typical prior art leading edge structure 1 is shown attached to a typical wing box structure 9 in FIG. 1. The leading edge structure 1 comprises a sub-structure with a sub-spar 2 and ribs 3a, 3b, 3c, 3d. The sub-spar 2 and the ribs 3 are mechanically fastened to a leading edge skin 4 using rivets 5. In addition, the skin 4 has spanwise stringers 6 running along it. A buttstrap 7 and further rivets 8 are used to attach the leading edge structure 1 to a skin 10 and main front spar 11 of the wing box structure 9.

In this prior art example, there are various rivets 5, 8 through the leading edge skin 4. This provides bumps on the leading edge skin surface, which have a negative effect on laminar flow.

An object of the present invention is to improve the laminar flow properties of leading edge structures, whilst also ensuring they are sufficiently robust and able to support a leading edge high lift mechanism.

SUMMARY OF THE INVENTION

According to a first aspect, the present invention provides a leading edge structure for providing an aerodynamic surface of an aircraft, the leading edge structure comprising a skin structure, the skin structure providing an outer aerodynamic surface and an inner surface, both surfaces extending in a chordwise and spanwise direction of the structure, and a plurality of structural members, each structural member being connected to the inner surface of the skin structure and extending in the chordwise direction along the inner surface, wherein the structural members are integrally formed with the inner surface of the skin structure.

Having structural members integrally formed with the inner surface of the skin structure means that a separate fastening does not have to be used to attach the structural members to the skin structure. This means that, for example, there are fewer rivets through the skin structure and therefore fewer corresponding bumps on the outer aerodynamic surface of the leading edge structure skin. This encourages laminar flow over the leading edge structure.

Preferably, the structural members are stiffeners or ribs for supporting the skin structure.

Preferably, the skin structure and the structural members are machined from a single billet or manufactured as a unitary composite material structure. Preferably, the skin structure and the structural members are cast together in a mould.

Preferably, the integral skin structure and structural members are provided with a plurality of mounting points for mounting aircraft systems.

More preferably, the structural members are ribs and each rib comprises a lattice structure of cells. A lattice structure provides a strong structure for the ribs. It allows the ribs to be shallow, and therefore easier to manufacture by casting.

Preferably, at least some of the lattice cells of the ribs are triangular.

Preferably, there are webs extending across at least some of the rib cells. The webs aid material flow in a casting mould during the casting process.

More preferably, at least some of the webs have at least one hole through them. Removing material, especially in thin sections of the webs, prevents poor material flow and cooling during casting.

Preferably, there is a riser node on at least some of the rib cell walls, preferably located at an apex of two or more rib cell walls. These riser nodes act as risers during the casting process.

Preferably, the structural members are flanges integrally formed with the inner surface of the skin structure and wherein the leading edge structure further comprises a plurality of ribs for supporting the skin structure, each rib extending by a depth below the skin structure and in the chordwise direction and being connected to an integrally formed flange. Having flanges integrally formed with the inner surface of the skin structure and having ribs connected to the flanges means that the ribs can be connected to the skin structure with fewer rivets through the skin structure and therefore fewer corresponding bumps on the outer aerodynamic surface of the leading edge structure skin. This encourages laminar flow over the leading edge structure. In addition, having the ribs separately formed from the skin/flanges structure, allows the skin/flanges structure to be manufactured by machining from solid billet, more easily and with a reduced wastage.

Preferably, each rib is connected to its flange using a plurality of fasteners extending through the rib and flange in the spanwise direction.

Preferably, the skin structure comprises a lattice of skin stiffening elements on the inner surface. These aid stiffness of the skin structure and the leading edge structure, as a whole.

Preferably, at least some of the lattice cells of the skin stiffening elements are triangular.

Preferably, there is a riser node at an apex of at least some of the skin stiffening elements. These riser nodes act as risers during the casting process.

Preferably, the skin structure has a variable thickness between the outer aerodynamic surface and the inner surface, in the chordwise and/or spanwise directions. The thickness can be varied to optimise stiffness (and waviness).

Preferably, the structural members are ribs for supporting the skin structure and wherein each rib comprises a removable portion, the removable portion preferably towards the front of the rib. Having a removable portion allows systems to be installed without having to feed them through holes in the ribs. The removable portion is preferably at the front of some or all of the ribs. Having the removable portion at the front of the ribs allows it to be used for rigging the leading edge skin structure to achieve tolerances suitable for achieving laminar flow. In other words, the leading edge skin structure could be set in the optimum position for laminar flow and then the removable portion could be made to the correct size/shape to accommodate this leading edge skin position. The removable portion could also be located at the underside of some or all of the ribs.

Preferably, the structural members are ribs and the leading edge structure comprises a support member connected to the underside of at least one rib, the support member being suitable for connection to another aircraft structural component, for example, an aircraft structural component that extends lower than the rib, such as a wing box. Having a support member allows the ribs to be shallower than they would be otherwise, as they do not have to extend down to the lower aircraft structural component. It also allows for the support member to be removed, allowing easier system installation and removal.

Preferably, the support member has a substantial depth compared to the depth of the ribs such that the depth that the ribs extend down from the skin structure is significantly less than the total depth of the leading edge structure. This provides a shallow rib.

More preferably, support member has a vertical component of approximately the same as the depth of the ribs such that the ribs extend down from the skin structure by approximately half of the total depth of the leading edge structure.

According to the first aspect, the present invention also provides a wing box structure comprising a front spar, a plurality of fitting components extending forwardly in a chordwise direction from the front spar, a support member extending vertically upwards from each fitting component and the leading edge structure as described above, wherein the leading edge structure is connected at the underside of at least one rib to the support member.

According to a second aspect, the present invention provides a leading edge structure for providing an aerodynamic surface of an aircraft, the leading edge structure comprising a skin structure, wherein the skin structure comprises an outer skin providing an outer aerodynamic surface and an inner skin, both surfaces extending in a chordwise and spanwise direction of the structure, wherein, at a plurality of locations, the inner skin is spaced apart from the outer skin so as to form a plurality of chordwise inwardly extending portions.

Having a double layered skin structure means that structural members can be connected to the inner skin surface, and therefore connected to the skin structure using fewer rivets through the outer skin surface and therefore fewer corresponding bumps on the outer aerodynamic surface of the leading edge structure skin. This encourages laminar flow over the leading edge structure. In addition, the outer skin can be manufactured to a greater tolerance than the inner skin, in order to meet the high tolerances required for laminar flow. The inner skin can be produced to provide additional stiffness to the skin structure.

Preferably, each chordwise inwardly extending portions has two side walls and a top wall, so as to provide a protrusion with a spanwise width between the two side walls. This allows a sub-structure to be connected to the top wall of the inner skin, spaced apart from the outer skin.

More preferably, the leading edge structure further comprises a sub-structure for supporting the skin structure, and wherein the sub-structure is connected to the inwardly extending portions, preferably connected only to the inwardly extending portions.

More preferably, the sub-structure comprises a plurality of ribs and each rib is connected to at least one of the inwardly extending portions.

Preferably, the top wall comprises a surface spaced apart from and approximately parallel to the outer skin and wherein the ribs are attached to the parallel surface. This means the ribs are connected to a surface parallel to the outer skin but not on the outer skin.

Preferably, the chordwise inwardly extending portions are stiffeners attached to the inner skin, each rib being provided with a chordwise recess corresponding to the shape of at least one of the stiffeners, such that each rib sits over the stiffener. This allows each rib to be kept in place on the stiffener, whilst providing a small amount of spanwise float of the rib in relation to the stiffener.

More preferably, the stiffeners are integrally formed with the inner skin. This means that fewer fasteners can be used.

Preferably, the corners of the walls are rounded so as to provide a U-shaped cross section.

Preferably, each rib is pinned to its corresponding chordwise protrusion in at least one chordwise location. This means that the rib is fixed in place, whist still aiding the spanwise float. Pinning, rather than bolting, also avoids crushing of the stiffeners.

Alternatively, each rib is bolted to its corresponding chordwise protrusion in at least one chordwise location.

Preferably, the inner and outer skins are connected together along a spanwise edge of the skins.

More preferably, the inner and outer skins are connected together by means of a fold of the edge of one of the skins, for example the outer skin, around the edge of the other skin, for example the inner skin.

According to a third aspect, the present invention provides a wing structure for an aircraft, the wing structure comprising a wing box structure with a wing skin structure, the wing skin providing an outer aerodynamic surface over the wing box structure extending in a chordwise and spanwise direction of the structure, wherein, at the front of the wing box structure, the wing skin structure provides a connection flange extending inwardly from the outer surface of the wing box structure, and a leading edge structure with a leading edge skin structure providing an outer aerodynamic surface over the leading edge structure extending in a chordwise and spanwise direction of the structure, wherein, at the rear of the leading edge structure, the leading edge skin structure provides a connection flange extending inwardly from the outer surface of the leading edge structure, wherein the wing box structure is connected to the leading edge structure by at least one fastener extending through both inwardly extending connection flanges.

Having the fastener extend through both inwardly extending flanges means that the fastener does not provide a corresponding bump on any of the outer aerodynamic surfaces of the wing. This encourages laminar flow.

In addition, the step height between the leading edge structure and the wing box structure can be adjusted during assembly. This can be done by rigging the two components and adjusting the height of the rigging to line up the upper surface of the wing box structure and the leading edge structure.

Preferably, the leading edge skin structure is a sandwich panel comprising an outer skin and an inner skin and wherein the leading edge connection flange is a stiffening member extending between the two skins. By having the fastener extending though the stiffening member provides a load path that travels around the fastener. This provides a more efficient joint.

Preferably, at least in the region of the rear of the leading edge structure, a core material is sandwiched between the inner and outer skins.

Preferably, a hole that the fastener passes through is a threaded hole, for example, provided by an anchor nut.

Preferably, the fastener is a single-sided fastener. In other words, installation of the fastener can be done with access to only one side of the fastener. For example, the fastener may comprise a barrel nut and screw or an anchor nut. This allows the fastener to be installed more easily. Preferably, a corresponding recess or passageway is provided to one side of the connection flanges, to allow the second part of the fastener to be connected into the first part of the fastener on one side of the connection flanges.

Preferably, the structure further comprises a wing box front spar and a sub-spar, the sub-spar being connected at an upper portion in between the two connection flanges and extending by a depth below the two skin structures. The sub-spar transfers some of the load from the fastener joint to the wing box structure. It also forms a closed box between the wing box front spar, and upper and lower wing box skin structures. This prevents a gap forming at the fastener joint (and therefore, a gap in the aerodynamic surface) and helps maintain laminar flow. The sub-spar also acts as a shield to prevent the wing box front spar (which could be made of composite material) from foreign object damage.

Preferably, the sub-spar is connected at a lower portion to a lower wing skin structure, for example, it may be connected to the lower wing skin structure by a lower flange. This provides better load transfer to the wing box structure.

Preferably, the wing structure comprises a forwardly extending portion, connected to the sub-spar.

Preferably, the structure also comprises a plurality of stub-ribs located to the rear of the sub-spar, each stub-rib being connected to an inner surface of the wing skin structure and extending by a depth below the wing skin structure and extending in the chordwise direction. Stub-ribs are desirable in view of the sub-spar, in order to provide a supporting structure in front of and behind the sub-spar.

According to a fourth aspect, the present invention provides a leading edge structure for providing an aerodynamic surface of an aircraft, the leading edge structure comprising a skin structure, the skin structure providing an outer aerodynamic upper surface extending in a chordwise and spanwise direction of the structure, an outer aerodynamic downwardly curved surface at the front of the upper surface, and an inner surface, a nose stiffening member for supporting the skin structure, wherein the nose stiffening member is attached to the inner surface of the skin structure behind the outer aerodynamic downwardly curved front surface and extends in the spanwise direction along the front portion of the leading edge structure.

Having a nose stiffening member at the front of the leading edge structure allows the skin structure to be supported above (and spaced apart from) the sub-structure beneath it. This helps to maintain the aerodynamic shape of the skin structure and prevents it being affected by "hard points" at joints with the sub-structure. These "hard points" induce waves. In addition, having a separate skin structure means there are fewer joints between the skin structure and sub-structure and therefore fewer fasteners providing bumps on the outer aerodynamic surface of the leading edge structure. Also, as the skin is separate from the sub-structure, there are fewer interfaces (whose tolerances have to be managed) and fewer fasteners that need installing. This makes assembly and repair quicker and easier. Furthermore, an Ice Protection System (IPS) can be simpler as it does not have to be installed around a sub-structure.

Preferably, the nose stiffening member has a curved front portion corresponding to the curve of the skin structure inner surface behind the outer aerodynamic downwardly curved front surface. The curved front portion is ideally a tight radius, meaning the nose stiffening member is inherently stiff.

Preferably, the nose stiffening member has a depth extending from the inner surface of the upper aerodynamic surface to an inner surface of a lower portion of the leading edge structure. Preferably, the nose stiffening member has a plate at its rear surface. Preferably, the nose stiffening member comprises a core made of a lightweight material, such as foam.

Preferably, the leading edge structure further comprises a plurality of ribs for supporting the skin structure, each rib extending by a depth below the skin structure and in the chordwise direction. More preferably, each rib is spaced apart from the inner surface of the skin structure, along at least a substantial portion of its chordwise length. The gap between the top of the ribs and the bottom of the skin structure could be 5 to 10 mm. This gap size would prevent fretting of the ribs and skin structure.

Preferably, the skin structure is a sandwich structure comprising an outer skin, providing the outer aerodynamic surfaces, an inner skin, providing the inner surface, and a core material.

Preferably, the leading edge structure further comprises a closing rib at each spanwise end for connecting to a wing box structure. The closing ribs may be connected to the nose stiffening member. This allows the nose stiffening member to transfer load to the closing ribs.

Preferably, the spanwise edges of the skin structure are attached inside recesses extending a depth inside each closing rib.

Preferably, each leading edge structure is connected to the wing box structure by at least its closing ribs. The leading edge structure may also be connected to the wing box structure by a fastener through both the skin structure and a forwardly extending portion of the wing box structure.

Preferably, the leading edge structure further comprises a plurality of stiffening members on the inner surface of the skin structure and extending in the chordwise direction, and a plurality of ribs for supporting the skin structure, each rib extending by a depth below the skin structure and in the chordwise direction and being connected to at least one of the stiffening members. The stiffening members on the inner surface of the skin reduce the unsupported panel size of the skin structure. This allows the weight of the leading edge structure to be reduced, whilst preventing buckling.

Preferably, each rib is connected to at least one stiffening member by a connection strut. This allows the ribs to not be directly connected to the skin structure and allows there to be a gap between the top of the ribs and the bottom of the skin structure. The gap between the top of the ribs and the bottom of the skin structure could be 5 to 10 mm. This gap size would prevent fretting of the ribs and skin structure. The ribs could also be bolted, or otherwise fastened, to a lower skin structure of the leading edge structure, as the lower skin structure is more protected from the oncoming airflow and achieving laminar flow is not so important.

Preferably, each rib is spaced in the chordwise direction from the stiffening member it is connected to and the connection strut extends diagonally between the rib and the stiffening member.

Preferably, the strut has an adjustable length. This allows the skin structure to be connected to the sub-structure in an adjustable way in order to achieve and maintain the optimum waviness.

The present invention also provides an aircraft wing, aircraft tailplane or aircraft vertical fin comprising a leading edge structure, wing box structure or wing structure according to any of the aspects of the invention.

The present invention also provides an aircraft comprising a wing, tailplane, vertical fin, leading edge structure, wing box structure or wing structure according to any of the aspects of the invention.

It will of course be appreciated that features described in relation to one aspect of the present invention may be incorporated into other aspects of the present invention. For example, features related to the ribs referred to in some aspects may also or alternatively be applied to the closing ribs of other aspects and vice versa. As another example, a skin structure of one aspect can comprise a skin panel, with both inner and outer skins, of another aspect. As a further example, the leading edge structure of one aspect can be attached to a wing box structure or wing structure as for another aspect. As a further example, the structural members (e.g. the ribs, stiffeners, inward protrusions or flanges) of one aspect can be formed or connected to the inner surface of the skin structure as for another aspect.

DESCRIPTION OF THE DRAWINGS

Embodiments of the present invention will now be described by way of example only with reference to the accompanying schematic drawings of which:

FIG. 2b shows a perspective view of part of a rib structure of the leading edge structure of FIG. 2a;

FIG. 3b shows an underside view of the skin structure of FIG. 3a;

FIG. 4b shows a sectional side view of the leading edge structure of FIG. 4a;

FIG. 5b shows a partial cutaway view of the leading edge structure of FIG. 5a;

FIG. 7b shows a partial perspective view of the leading edge structure of FIG. 7a;

FIG. 9a shows a side sectional view of a wing structure including a leading edge structure according to a second embodiment of the fourth aspect of the invention; and, FIG. 9b shows a partial inside underside view of the leading edge structure of FIG. 9a.

DETAILED DESCRIPTION

Figure 1:
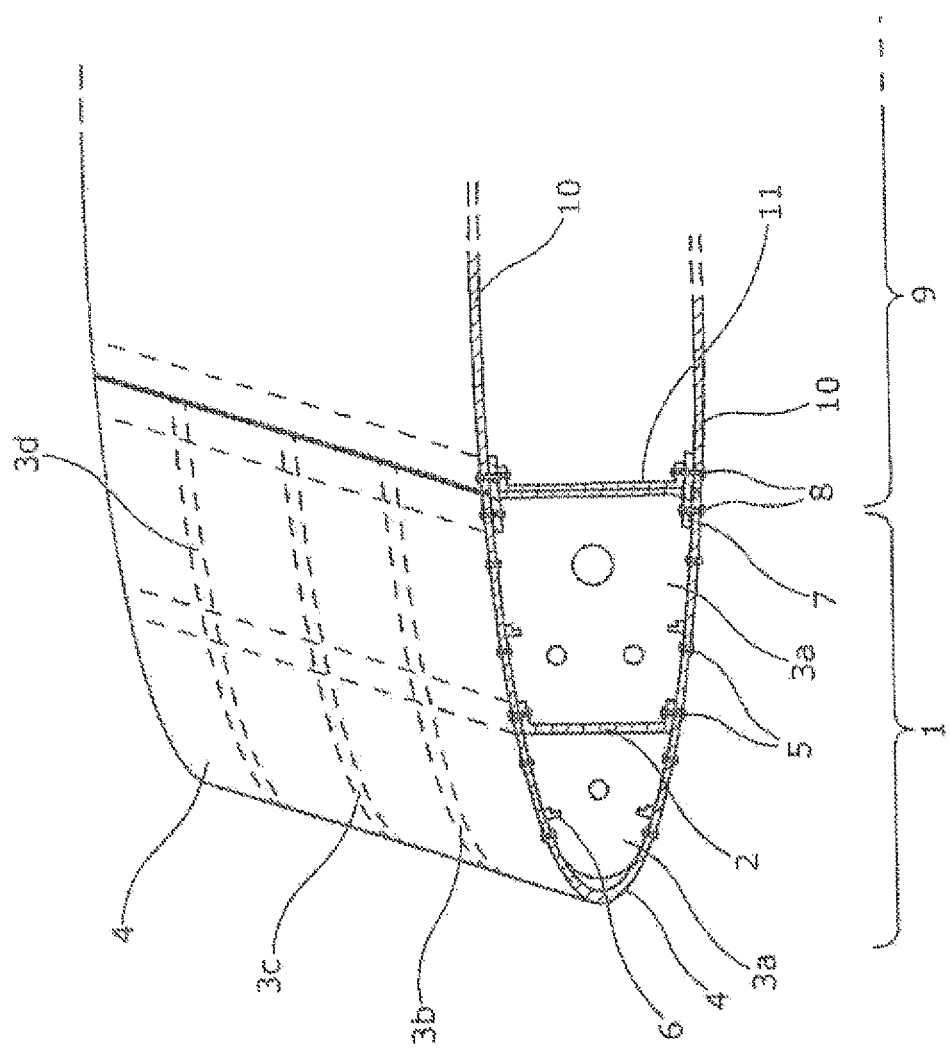
FIG. 1 shows a typical prior art leading edge structure.
Figure 2A:
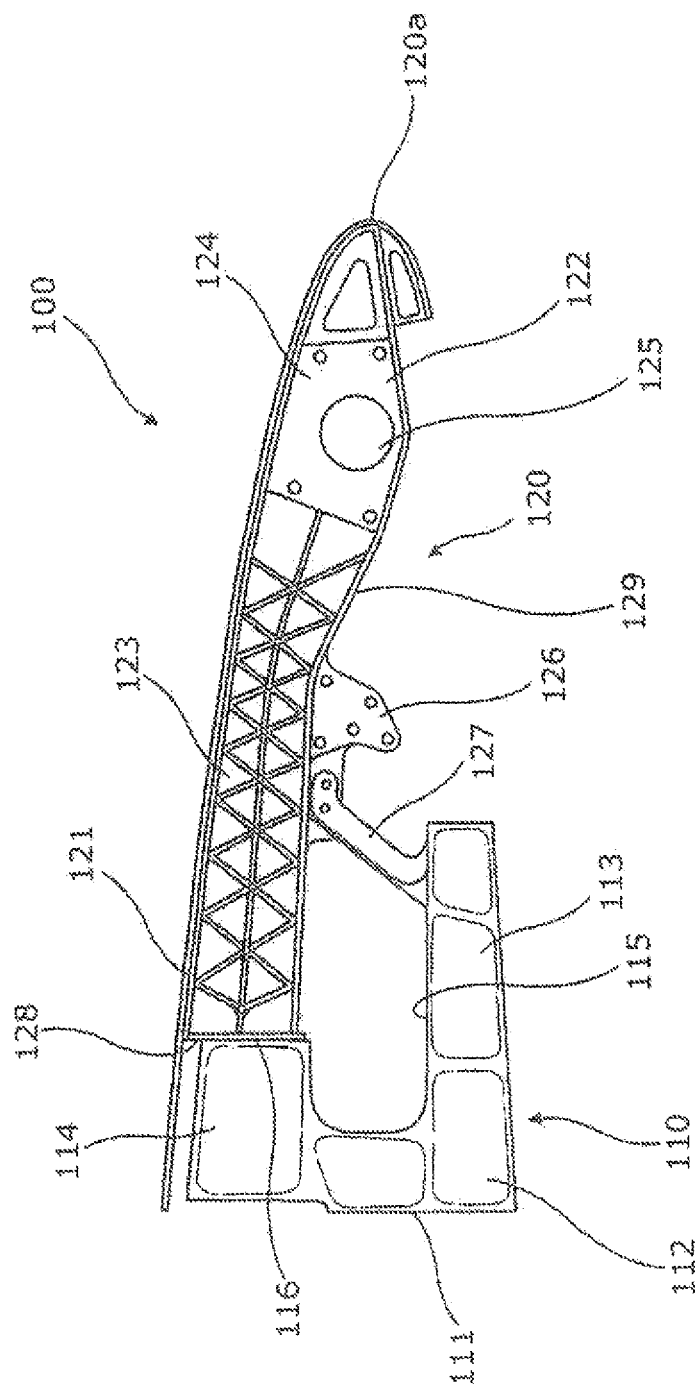
FIG. 2a shows a side sectional view of part of a wing structure, including a leading edge structure according to a first embodiment of the first aspect of the invention.

FIG. 2a shows a view of part of a wing structure 100, including a wing box structure 110 and a leading edge structure 120, according to a first embodiment of the first aspect of the invention.

The wing box structure 110 comprises a front main spar 111 with a machined fitting 112 attached to it. The machined fitting 112 has two forwardly extending portions 113, 114.

The first, lower forwardly extending portion 113 extends from the bottom of the spar 111. The second, upper forwardly extending portion 114 extends from the top of the spar 111.

The leading edge structure 120 comprises an upper skin 121 which forms the front nose 120a of the wing. Underneath the upper 121 are various ribs (one, 122, shown). Each rib 122 is integrally formed with the upper skin 121 and has a lower stiffening flange 129. In addition, the upper skin 121 is provided with integral stiffeners/varied thickness (not shown).

Each rib 122 has a front portion 124 near the nose 120a, which is a solid portion, with various weight saving "cut-outs" 125. Of course, these holes 125 do not have to actually be formed by "cutting out" material, they could be formed from a casting mould, for example. The "cut-outs" 125 could be used for mounting or running of systems. Each rib also has a rear portion 123 where the rib 122 has a lattice pattern. This lattice pattern is shown in more detail in FIG. 2b and described below.

The rear portion 123 of each rib 122 has a depth approximately that of the forward face 116 of the upper forwardly extending portion 114 of the wing box structure 110. At the rear of the leading edge portion is a rear abutment face 128 which abuts a forward face 116 of the upper forwardly extending portion 114 of the wing box structure 110. Below at least some of the ribs 122, there is a support flange 126. A support member 127 is bolted to this flange 126 and rests upon a top surface 115 of the lower forwardly extending portion 113 of the wing box structure 110. This supports the shallow ribs 122.

Turning to FIG. 2b, the lattice pattern in the rear portion 123 of each rib 122 comprises a plurality of triangular cells 123a with walls 123b and webs 123c extending across the cells 123a between the walls 123b. The webs 123c have "cut-outs" 123d. Again, these holes 123d in the webs do not have to actually be formed by "cutting out" material, they could be formed from a casting mould, for example. At an apex of the cell walls 123b are riser nodes 123e.

In manufacture, the upper skin 121 and the ribs 122 are cast together in a casting mould. The mould provides the rib cell webs 123c in order to aid material flow during the casting process. The mould also removes the central "cutout" portions 123d of the webs 123c to prevent poor material flow and unwanted cooling during the casting process. In addition, the mould provides the riser nodes 123e to act as risers during the casting process. The mould would also provide the various support flanges 126 on the underside of the ribs 122. In addition, the mould would also provide various systems mounting points (not shown) on the leading edge structure.

Each rib 122 and upper skin 121 component would be cast in (spanwise) lengths of approximately 4 metres. The components have a width (chordwise length) and depth ranging from 1 m×1 m to 450 mm to 150 mm. After casting, machining is used to achieve the required tolerance in key areas.

Alternatively, the upper skin 121 and ribs 122 can be manufactured as an integral composite component or can be machined from a solid metallic alloy billet.

During assembly, the machined fitting 112 is attached to the wing box structure front main spar 111. Various machined support members 127 are then attached to the upper surface 115 of the lower forwardly extending portion 113. The integral rib 122 and upper skin 121 components are then attached to the forward face 116 and the various support members 127 are bolted to the various support flanges 126.

During maintenance, the support members 126 could be removed to allow access for systems removal and installation. In addition, the leading edge structure 120 can be removed from machined fitting 112, without damaging a seal around a fuel tank in the wing, formed by the front main spar 111.

Figure 3A:
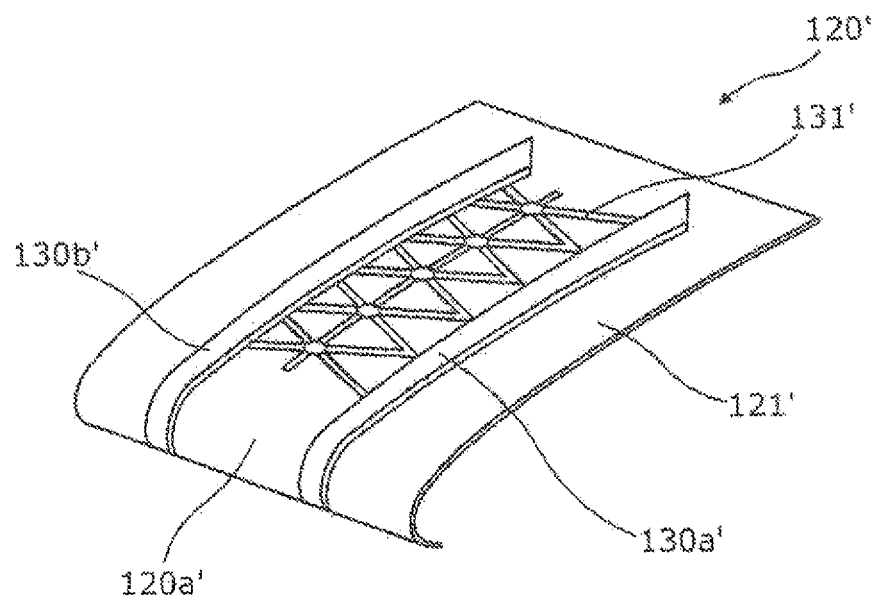
FIG. 3a shows a perspective view of part of the top of a leading edge skin structure according to a second embodiment of the first aspect of the invention.
Figure 3B:
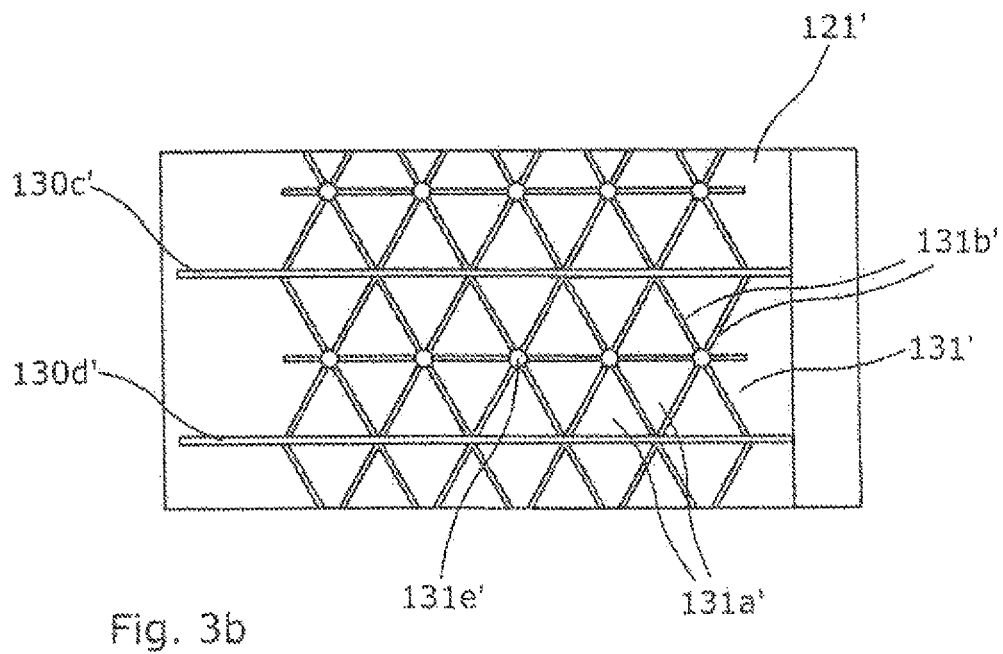

FIGS. 3a and 3b show views of part of a leading edge 120' skin structure 121', according to a second embodiment of the first aspect of the invention.

The skin structure 121' comprises various flanges 130a', 130b' extending in a chordwise direction from the nose 120a' along the inside of the skin structure 121'. These flanges 130a', 130b', 130c', 130d' are integrally formed with the skin structure 121' by casting, for example. During assembly, ribs are mounted on these flanges 130'.

In addition, the skin structure 121' has a varying thickness and has a lattice pattern 131' formed in between each of the flanges 130' on the inner face of the skin structure 121'. The lattice pattern 131' comprises triangular cells 131a' with cell walls 131b' and riser nodes 131e'.

As well as casting, the skin structure 121' can be manufactured as an integral composite component or can be machined from a solid metallic alloy billet.

Figure 4A:
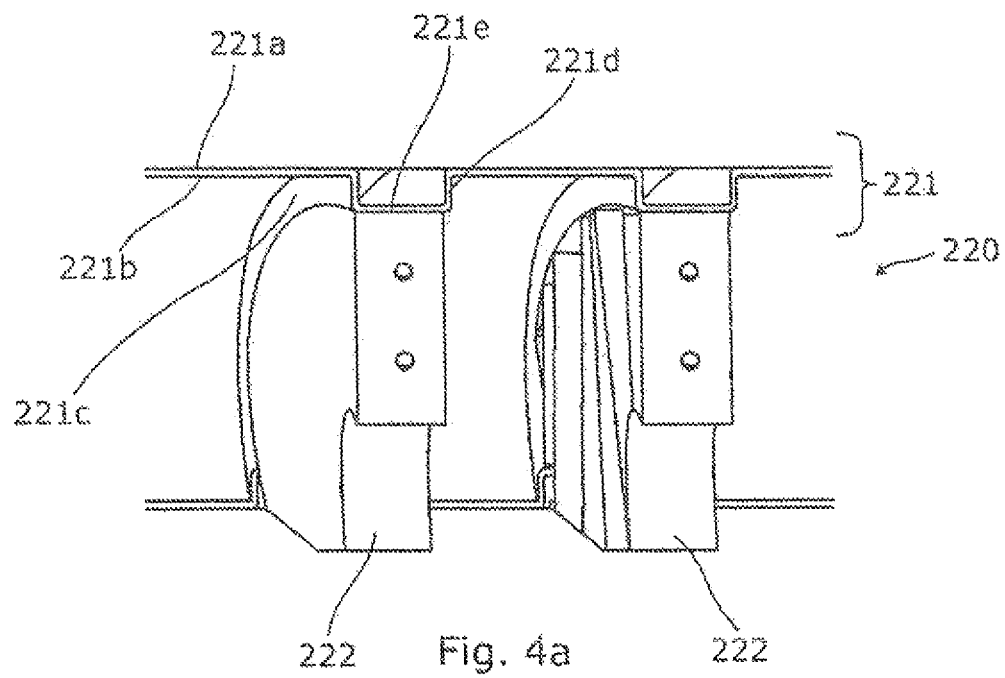
FIG. 4a shows an inside view of part of a leading edge structure according to a first embodiment of the second aspect of the invention.
Figure 4B:
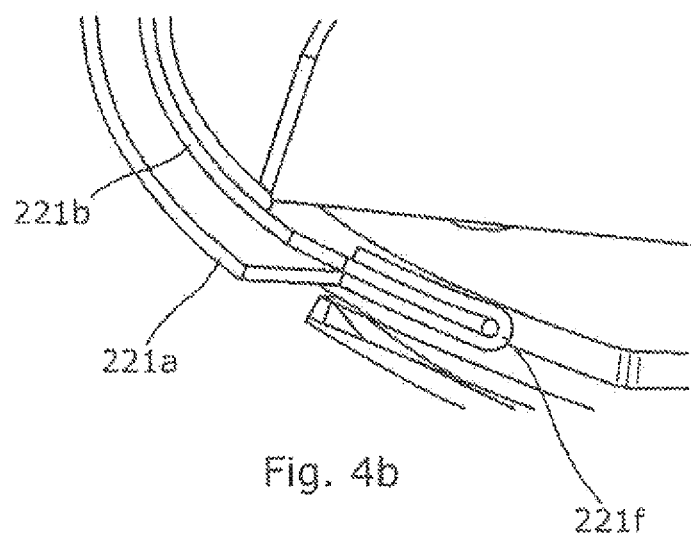

FIGS. 4a and 4b show views of part of a leading edge structure 220 according to a first embodiment of the second aspect of the invention.

The leading edge structure 220 comprises an upper skin structure 220 with both an outer (upper) skin 221a and an inner (lower) skin 221b. The outer 221a and inner 221b skins are generally adjacent to one another. However, at various spanwise locations, the inner skin 221b is bent inwards to form "top hat" sections. These "top hat" sections are formed by two side edges 221c, 221d extending inwards, substantially perpendicular (within about 5 degrees) to the planes of the two skins and a top edge 221e extending substantially parallel, but spaced inwardly apart from the planes of the two skins. The top edge 221e of each "top hat" section has a rib 222 mounted on it. The "top hat" sections provide stiffness to the skin structure 221.

In addition, the inside of the outer skin 221a is formed with some milling/chemical etching of areas to tailor the stiffness.

FIG. 4b shows an end view of the nose region of the leading edge structure. Here, it can be seen that the outer 221a and inner 221b skins are cinched together by folding the outer skin 221a around the inner skin 221b by a 180 degree fold 221f. This fold 221f extends along the spanwise length of the leading edge structure 220. Alternatively, the two skins 221a, 221b could be bonded together. In addition, the skins 221a, 221b can be connected to each other through a combination of bonding, cinching and mechanical fastening. However, mechanical fastening would only be used in regions where laminar flow is not critical.

During manufacture, the outer skin 221a is manufactured to high tolerances (for laminar flow). If made of aluminium alloy, the outer skin 221a could be manufactured using Stretch Forming or Super Plastic Forming. If made of aluminium alloy, the inner skin 221b could be manufactured using Super Plastic Forming. If made of titanium alloy, the skins 221a, 221b could additionally be manufactured using a combination of Diffusion Bonding and Super Plastic Forming, resulting in the sheets 221a, 221b being formed and bonded together in the same operation.

Figure 5A:
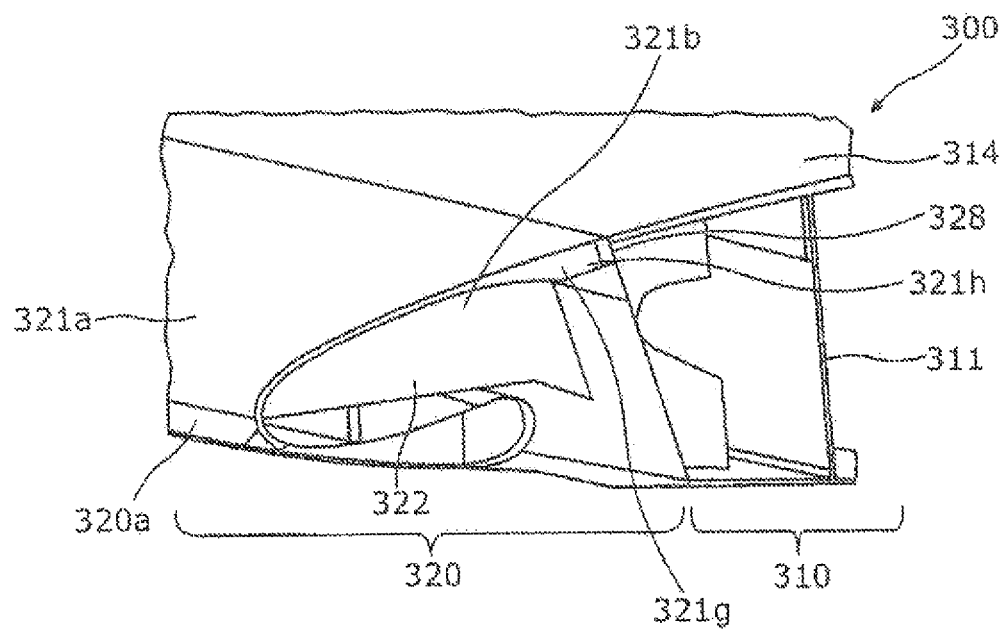
FIG. 5a shows a side perspective view of part of a wing structure, including a leading edge structure, according to a first embodiment of the third aspect of the invention.
Figure 5B:
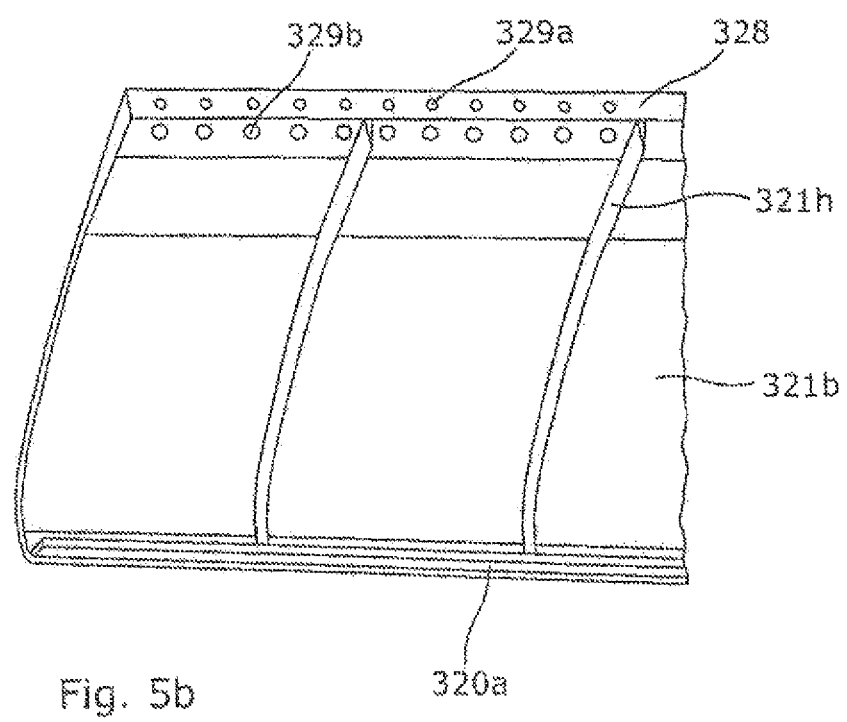

FIGS. 5a and 5b show views of part of a wing structure 300, including a wing box structure 310 and a leading edge structure 320, according to a first embodiment of the third aspect of the invention.

The wing box structure 310 comprises a front main spar 311 and a wing box skin 314. The wing box structure 310 also comprises a lower wing box skin and a sub-spar (not shown).

The leading edge structure 320 comprises a plurality of ribs extending from the nose 320a in a chordwise direction. The leading edge structure 320 has a skin structure comprising an outer skin 321a and an inner skin 321b. The two skins are either made of carbon fibre reinforced plastic, aluminium alloy or titanium alloy. In between the two skins is core material 321g. This core material 321g can be honeycomb or closed-cell foam or aluminium honeycomb and is bonded to both skins. A plurality of chordwise extending stiffening members 321h are also provided in between the two skins. These are bonded to the skins at the same time as the core material 321g. Towards the rear of the leading edge structure 320, the inner skin 321b extends away from the outer skin 321a to make a wider gap between the two skins. An end face 328 is formed at the rear end of the leading edge structure 320 extending between the two skins 321a, 321b.

FIG. 5b shows the end face 328 with holes 329a through it. In addition, the rear portion of the inner skin 321b is also provided with a plurality of corresponding holes 329b. These holes 329a, 329b are for accommodating barrel nuts to attach the leading edge structure to the sub-spar (not shown) of the wing box structure 310.

During assembly, a barrel nut is inserted through each hole 329b and also through a corresponding hole in the sub-spar (not shown) of the wing box 310. A bolt is then inserted through each corresponding hole 329a and into the barrel nut to fix the barrel nut in place. Alternatively, threaded holes 329a could be used (without holes 329b) or anchor nuts could be used.

Figure 6:
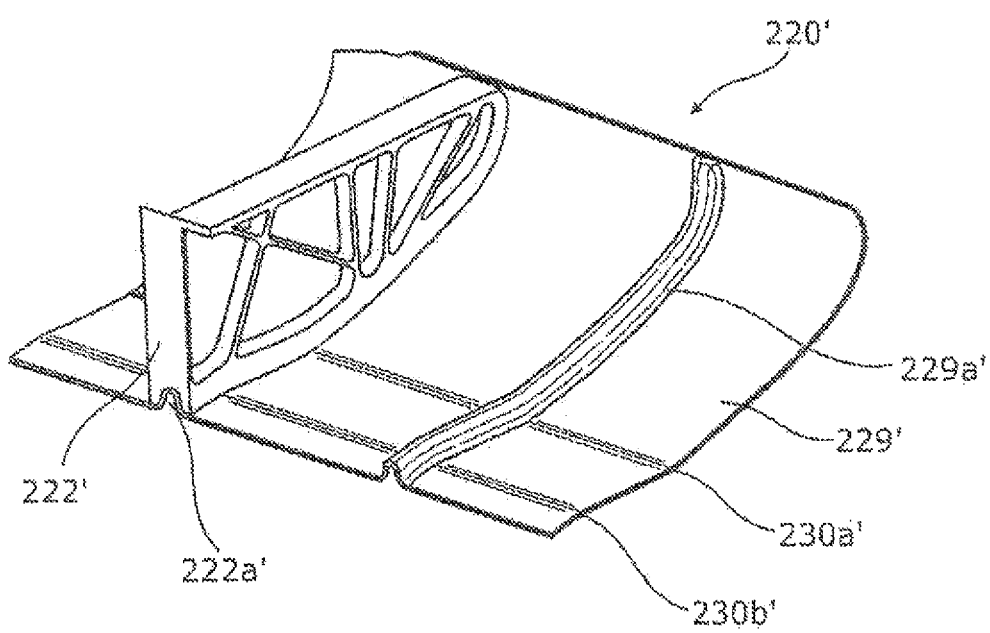
FIG. 6 shows a cutaway inside view of a part of a leading edge structure according to a second embodiment of the second aspect of the invention.

FIG. 6 shows a cutaway inside view of a part of a leading edge structure 220' according to a second embodiment of the second aspect of the invention.

The leading edge structure 220' comprises a lower skin 229' and a plurality of ribs 222' extending chordwise in the structure. The lower skin 229' is formed with a plurality of inward ridges 229a' acting as stiffeners, extending longitudinally along the skin. These inward ridges 229a' are U-shaped. Each rib 222' has a corresponding U-shaped indent 222a' in its lower face such that each rib 222' sits on a corresponding ridge 229a'.

Each rib 222' is pinned in place on the ridge 229a' at two (or more) chordwise locations. The ribs 222' are pinned to allow a small amount of spanwise float and to avoid crushing of the inward ridges 229a'. The skin 229' has two skin folds 230a', 230b' extending spanwise along the skin 229'.

During manufacture, the skin could be integrally formed with the inward ridges 229a' using machining or casting. If made of aluminium alloy, the skin 229' could be manufactured using Stretch Forming or Super Plastic Forming. If made of titanium alloy, the skin 229' could additionally be manufactured using a combination of Diffusion Bonding (with the skin 229') and Super Plastic Forming. The ribs 222' could be machined from aluminium alloy billet. Alternatively, the ribs 222' could be made from thermoplastic or could be an MMC (Metal Matrix Composite) rib. The MMC Rib may be made from an aluminium base material with silicon carbide particles added (while the aluminium is molten) to give extra stiffness. Both of these options offer a weight saving.

Figure 7A:
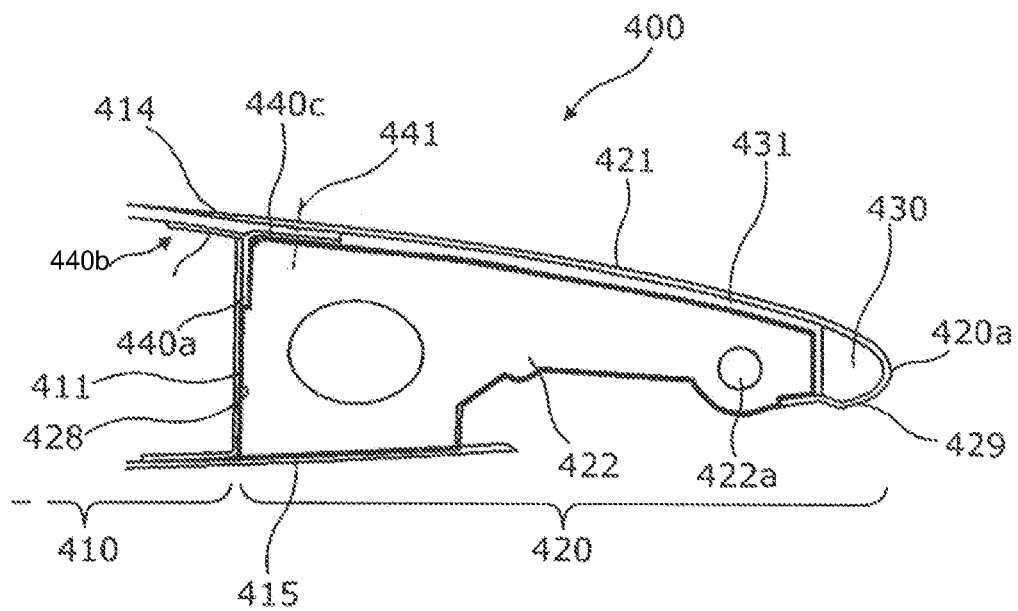
FIG. 7a shows a side sectional view of a wing structure, including a leading edge structure according to a first embodiment of the fourth aspect of the invention.
Figure 7B:
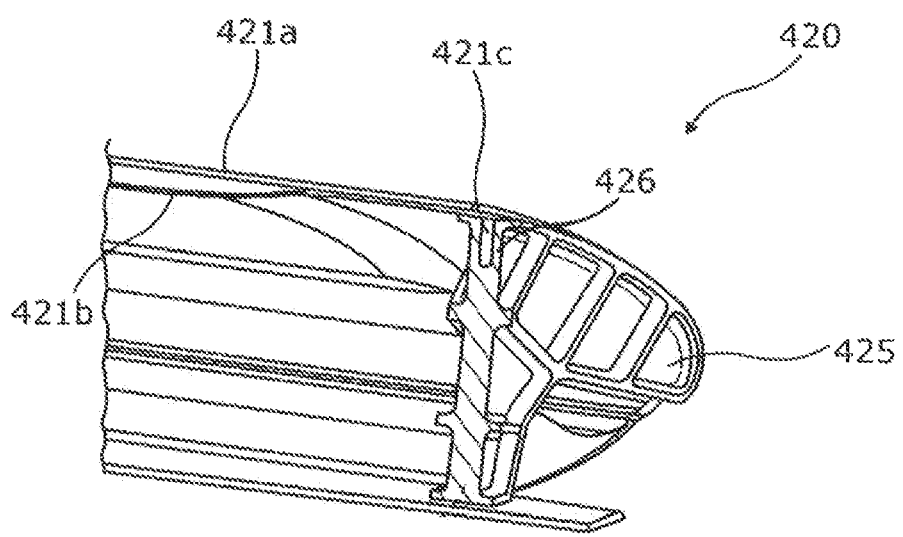

FIGS. 7a and 7b show views of a wing structure 400, including a wing box structure 410 and a leading edge structure 420 according to a first embodiment of the fourth aspect of the invention.

The wing box structure 410 comprises a front main spar 411, a wing box upper skin 414 and a wing box lower skin 415.

The leading edge structure 420 comprises an upper skin structure 421, with an outer skin 421a and an inner, spaced apart skin 421b and a lipped skin portion 429. At a nose portion 420a of the leading edge structure is a "bullnose" stiffening member 430 abutting the inside surface of the leading edge skin structure at the nose 420a. The "bullnose" stiffening member 430 has a U-shape front portion, a rear plate and a foam core.

A plurality of ribs 422 with "cut-outs" 422a extend chordwise in the structure 420 from the front of the main spar 411 to just in front of the bullnose 430. Of course, these holes 422a do not have to actually be formed by "cutting out" material, they could be formed from a casting mould, for example. Importantly, the skin structure 421 is spaced apart from the top of the ribs 422 by a gap 431, which is maintained using the bullnose stiffener 430. This gap is approximately 5-10 mm deep.

The ribs 422 are fastened to the leading edge lipped skin portion 429 using fasteners 432. The ribs 422 are also attached to a joint member 440. The joint member 440 is in the form of a T-shape cross section, with a first part 440a extending down in front of the main spar 411 and behind a rear face 428 of the leading edge structure 420, a second part 440b extending behind over a front portion of the main spar 411 and a third part 440c extending across the top of a rear portion of the top of the ribs 422. The joint member 440 extends spanwise across the structure and is integrally co-cured (in CRFP) with the upper skin of the wingbox.

The leading edge skin structure 421, ribs 422 and joint member 440 are attached together using fasteners 441 extending through each rib and the joint member 440 and skin structure 421.

As shown in FIG. 7b, the leading edge structure 420 also comprises closing ribs 425 at the chordwise ends of each skin structure 421 panel. Each panel is approximately 4 m in the spanwise direction. Here, the outer 421a and inner 421b skins are adjacent each other and are folded downwards into an indent 426 in the top of each closing rib 425.

The skin structure 421 can be manufactured using aluminium alloy, titanium alloy, carbon re-inforced plastic or MMC material. During assembly, the sub-structure (including ribs 422) is attached to wing box structure 410 before the leading edge skin structure 421 is attached to the structure. Each skin structure 421 panel is ready supplied with Ice Protection System (not shown) prior to connection to the structure. Once each skin structure panel is attached, the Ice Protection System can be connected to the rest of the aircraft systems.

Figure 8:
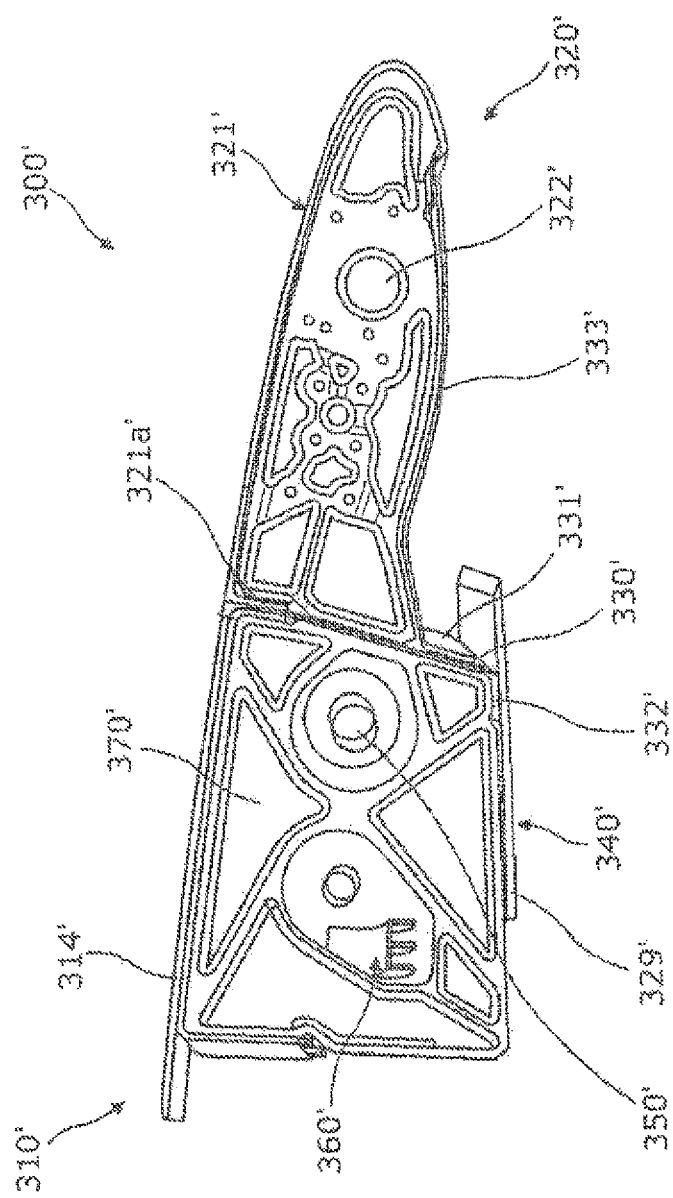
FIG. 8 shows a partial side sectional view of a wing structure, including a leading edge structure, according to a second embodiment of the third aspect of the invention.

FIG. 8 shows a view of a wing structure 300', including a wing box structure 310' and a leading edge structure 320', according to a second embodiment of the third aspect of the invention.

The wing box structure 310' comprises a front main spar 311' (not shown), a lower skin (not shown) and a wing box upper skin 314'.

The leading edge structure 320' comprises an upper skin 321' extending over a front portion of the leading edge structure 320' and a lower skin 329'. The lower skin 329' has an access panel 340' in it. Beneath the upper skin 321' is a plurality of leading edge ribs 322'. The upper skin 321' has a rearward inwardly facing flange 321a' which abuts against the rear face of the ribs 322'.

Behind the flange 321a' of the skin 321' is a sub-spar 330' which has a first portion 332' which extends from the top of the flange 321a' to the bottom skin 329'. It also has a second portion 332' which extends rearwardly along a chordwise length of the bottom skin 329'. Finally, the sub-spar 330' has a third portion 333' which is attached to the first portion 331' and extends forwardly from the first portion 331' along the underside of the ribs 322' towards the nose portion of the leading edge structure 320'. This separate third portion 333' is a closing panel with a lightweight construction.

Behind the first portion 331' of the sub-spar 330' is a plurality of stub-ribs 370', each corresponding to a rib 322'. These stub-ribs have "cut-outs" for systems channels 360' and drive shafts for high lift devices 350'. Of course, these holes do not have to actually be formed by "cutting out" material, they could be formed from a casting mould, for example. The second portion 332' of the sub-spar 330' extends underneath a chordwise length of the underside of the stub-ribs 370'. The wing box skin 314' extends forwardly from the wing box structure to cover the topside of the stub ribs 370', with its forward end abutting against the leading edge skin 321'.

The main wing box skin 314' is manufactured from carbon fibre re-inforced plastic and is co-cured with the stub-ribs 370'. The sub-spar 330' is manufactured from aluminium alloy. The sub-spar 330' could be made from carbon fibre re-inforced plastic. However, an advantage of the sub-spar 330' is that it protects the carbon fibre re-inforced plastic front main spar 311' from foreign object damage and so does this best if made from metallic alloy.

During assembly, the leading edge skin 321', ribs 322' are attached together. The stub-ribs 370' and wing box skin 314' are also attached together. The sub-spar 330' is then placed in front of the stub-ribs 370' and the leading edge skin 321' and ribs 322' are attached to the sub-spar 330' and stub-ribs 370' through fasteners (not shown) extending through the inward flange 321a' of the leading edge skin 321', the sub-spar 330' and the stub ribs 370'.

Figure 9A:
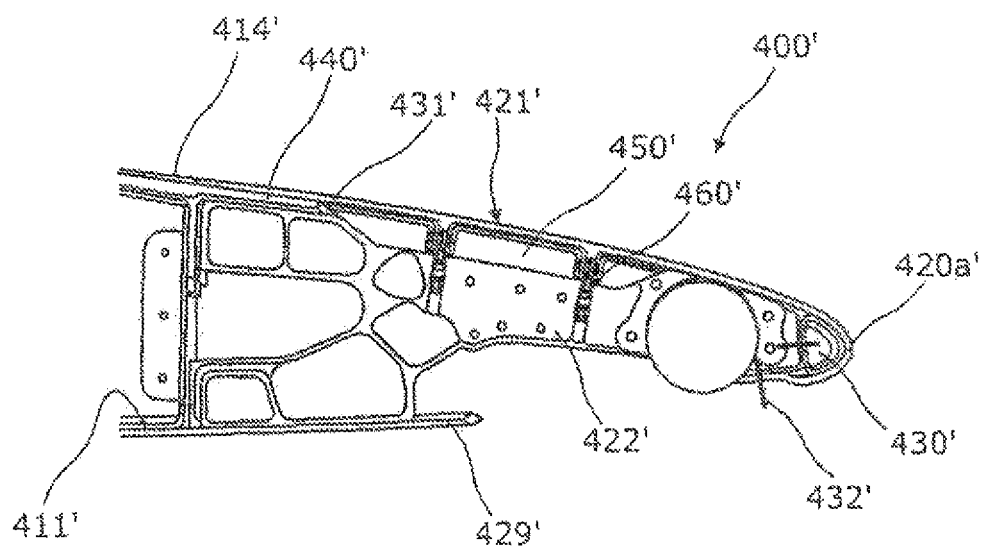
Figure 9B:
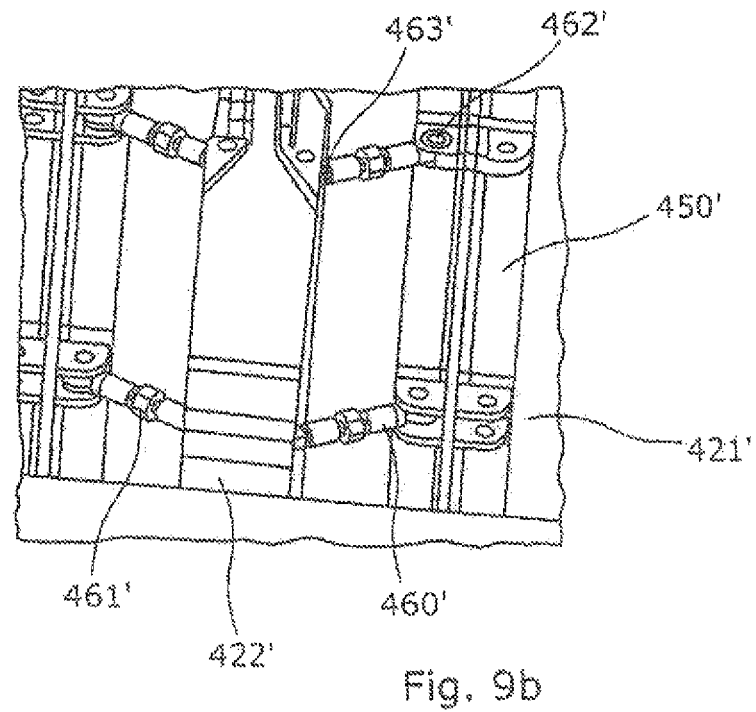

FIGS. 9a and 9b show views of a wing structure 400', including a wing box structure 410' and a leading edge structure 420' according to a second embodiment of the fourth aspect of the invention.

The wing box structure 410' comprises a front main spar 411', a wing box upper skin 414' and a wing box lower skin 429'.

The leading edge structure 420' comprises an upper skin 421'. At a nose portion 420a' of the leading edge structure is a "bullnose" stiffening member 430' abutting the inside surface of the leading edge skin structure at the nose 420a'. This "bullnose" stiffening member is similar to "bullnose" stiffening member 420a in FIGS. 7a and 7b.

A plurality of stiffeners 450' are attached to the underside of the upper skin 421' and extend in a chordwise direction along the structure. These stiffeners 450' could be bonded, welded or integrally cast to the skin 421'. The skin 421' could be machined from billet.

A plurality of ribs 422' extend chordwise in the structure 420' from the front face of the front main spar 411' to just in front of the bullnose 430'. Importantly, the skin structure 421' is spaced apart from the top of the ribs 422' by a gap 431', which is maintained using the bullnose stiffener 430. This gap is approximately 5-10 mm deep.

The ribs 422' are fastened to the wing box lower skin 429' using fasteners 432'. The ribs 422' are also attached to a joint member 440'. The joint member 440' is similar to the joint member 440 in FIG. 7a.

The ribs 422' are fastened to the leading edge upper skin 421' by diagonal struts 460'. Each rib 422' has two corresponding stiffeners 450'; one each side of the rib 422' and integrally attached to the upper skin 421'. Each rib 422' has two diagonal struts 460' pivotally attached 463' at a top region of each side of the rib 422'. The diagonal struts 460' also pivotally attach 462' to the corresponding stiffener 450' on that side of the rib 422'. Hence, the rib 422' is attached to the leading edge upper skin 421'. The diagonal struts 460' comprise a length adjustment screw 461' approximately mid-way along their length.

The skin structure 421' can be manufactured using aluminium alloy or titanium alloy, MMC material or a composite material with metallic bushes where the diagonal struts 460' are. The sub-structure (including ribs 422') can be manufactured using aluminium alloy or manufactured from a thermoplastic material.

During assembly, the sub-structure (including ribs 422') is attached to wing box structure 410' before the leading edge skin structure 421' and integral stiffeners 450' are attached to the structure. The ribs 422' are then attached to the corresponding stiffeners 450' using the diagonal struts 460'. The lengths of the diagonal struts 460' are adjusted using the screws 461'.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The various components and structures may be manufactured using machining, casting, welding, bolting, and any other suitable method. The materials used may be metallic alloy, such as aluminium and titanium alloy and also composite materials, such as Carbon Fibre Reinforced Polymer (CFRP).

Features of any of the embodiments could be combined with other embodiments. For example, the feature of the integral ribs 122 of the embodiment of FIGS. 2a and 2b could be used with the closing ribs 425 of the embodiment of FIGS. 7a and 7b, any of the ribs 322' of the embodiment of FIG. 8, or closing ribs of the embodiment of FIGS. 9a and 9b.

Also, the feature of the integral stiffeners 130a' of the embodiment of FIGS. 3a and 3b could be used with the closing ribs 425 of the embodiment of FIGS. 7a and 7b, any of the ribs 322' of the embodiment of FIG. 8, or the stiffeners 450' of the embodiment of FIGS. 9a and 9b.

Also, the feature of the double layered leading edge skin 221 of the embodiment of FIGS. 4a and 4b could be used with the skin 421 of the embodiment of FIGS. 7a and 7b, the skin 321' of the embodiment of FIG. 8, or the skin 421' of the embodiment of FIGS. 9a and 9b.

Also, the feature of the barrel nut holes 329a, 329b of the embodiment of FIGS. 5a and 5b could be used to attach the leading edge structure 320' to the wing box structure 310' in the embodiment of FIG. 8.

Also, the feature of the inward ridges 229a' acting as stiffeners of the embodiment of FIG. 6 could be used with the closing ribs 425 of the embodiment of FIGS. 7a and 7b, any of the ribs 322' of the embodiment of FIG. 8, or the stiffeners 450' of the embodiment of FIGS. 9a and 9b.

Where in the foregoing description, integers or elements are mentioned which have known, obvious or foreseeable equivalents then such equivalents are herein incorporated as if individually set forth. Reference should be made to the claims for determining the true scope of the present invention, which should be construed so as to encompass any such equivalents.

It will also be appreciated by the reader that integers or features of the invention that are described as preferable, advantageous, convenient or the like are optional and do not limit the scope of the independent claims.

Moreover, it is to be understood that such optional integers or features, whilst of possible benefit in some embodiments of the invention, may not be desirable, and may therefore be absent, in other embodiments.

The invention claimed is:

1. A wing structure for an aircraft, the wing structure comprising:
   a main spar;
   a leading edge upper skin that forms an outer aerodynamic surface;
   a wing box structure comprising:
      a rear part formed integrally with a wing box upper skin that forms an outer aerodynamic surface;
      a front part that extends forwardly of the rear part and has an upper surface that is offset below a level of the upper surface of the wing box upper skin at a front end of the wing box upper skin;
   and the leading edge upper skin is mounted on the front part such that the leading edge upper skin is flush with the wing box upper skin;
   wherein the wing structure further comprises a joint member comprising an upwardly extending first part, a second part extending rearwardly from the first part, and a third part extending forwardly from the first part and disposed between the upper skin and the upper surface of the front part, wherein the joint member has a substantially T-shaped cross-sectional configuration;
   the first part of the joint member is attached to and extending in front of the main spar and behind a rear face of the leading edge structure;
   the second part of the joint member is attached to the rear part of the wing box structure and disposed between the upper skin and a rearwardly extending portion of the main spar;
   and wherein the second part of the joint member is inclined upwardly, at an obtuse angle relative to the first part.

2. The wing structure according to claim 1, wherein the third part of the joint member is inclined downwardly at an acute angle relative to the first part.

3. The wing structure according to claim 1, wherein the rear part of the wing box structure is integrally co-cured with the wing box upper skin.

4. The wing structure according to claim 1, wherein the second part of the joint member is integrally co-cured with the rear part of the wing box structure.

5. The wing structure according to claim 1, wherein the third part of the joint member is formed integrally with the front part of the wing box structure.

6. The wing structure according to claim 5, wherein the third part of the joint member is integrally co-cured with the front part of the wing box structure.

7. The wing structure according to claim 1, wherein the leading edge upper skin is attached to the front part of the wing box structure by fasteners.

8. The wing structure according to claim 1, wherein the leading edge upper skin is also attached to the third part of the joint member by a plurality of fasteners.

9. The wing structure according to claim 1, wherein the third and second parts of the joint member have the same thickness.

10. An aircraft wing, aircraft tailplane or aircraft vertical fin comprising the wing structure according to claim 1.

11. An aircraft comprising the wing, tailplane or vertical fin according to claim 10.

\* \* \* \* \*